(12) United States Patent
Wang et al.

(10) Patent No.: US 9,923,964 B2
(45) Date of Patent: Mar. 20, 2018

(54) METHOD, SYSTEM AND COMPUTER-READABLE STORAGE MEDIUM FOR CROSS-PLATFORM SYNCHRONIZATION OF CONTACTS IN A MULTI-PLATFORM ENVIRONMENT

(71) Applicant: Tencent Technology (Shenzhen) Company Limited, Shenzhen (CN)

(72) Inventors: Yongxin Wang, Shenzhen (CN); Bin Li, Shenzhen (CN); Jing He, Shenzhen (CN); Yu Chen, Shenzhen (CN); Junshan Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 341 days.

(21) Appl. No.: 14/311,882

(22) Filed: Jun. 23, 2014

(65) Prior Publication Data
US 2014/0379805 A1  Dec. 25, 2014

Related U.S. Application Data

(63) Continuation of application No. PCT/CN2013/090990, filed on Dec. 31, 2013.

(30) Foreign Application Priority Data

Jun. 19, 2013  (CN) .......................... 2013 1 0244821

(51) Int. Cl.
G06F 15/16 (2006.01)
H04L 29/08 (2006.01)
G06Q 50/00 (2012.01)

(52) U.S. Cl.
CPC ......... *H04L 67/1095* (2013.01); *G06Q 50/01* (2013.01)

(58) Field of Classification Search
CPC .............. G06Q 50/01; G06Q 20/4012; G06Q 20/3552; H04L 67/1095; H04L 63/08;
(Continued)

(56) References Cited

U.S. PATENT DOCUMENTS

| 2012/0221437 A1* | 8/2012 | Yoo ........................ G06Q 50/01 705/26.41 |
| 2013/0097529 A1* | 4/2013 | Postoaca ................ G06Q 50/01 715/753 |

(Continued)

FOREIGN PATENT DOCUMENTS

| CN | 102111346 A | 6/2011 |
| CN | 102143485 A | 8/2011 |
| CN | 102244695 A | 11/2011 |

OTHER PUBLICATIONS

International Search Report and Written Opinion for Application No. PCT/CN2013/090990 dated Mar. 13, 2014.

*Primary Examiner* — Dustin Nguyen
*Assistant Examiner* — Hao Nguyen
(74) *Attorney, Agent, or Firm* — Tim Tingkang Xia, Esq.; Locke Lord LLP (57) ABSTRACT

A method for cross-platform synchronization of contacts in a multi-platform environment is disclosed. The method includes: acquiring a contact to be associated with an account in a social platform; acquiring an account of a friend associated with the contact in the social platform, and binding a phone number of the contact with the associated account of the friend in the social platform; and uploading the phone number and the account in the social platform bound together to a server. When it needs to view social information of a contact, the above method can simplify user operation, reduce time spent for operation in the mobile terminal and increase the battery life of the mobile terminal.

(Continued)

Furthermore, a device for cross-platform synchronization of contacts in a multi-platform environment is also disclosed.

9 Claims, 10 Drawing Sheets

(58) Field of Classification Search
CPC ... H04L 51/32; H04L 63/0876; H04L 67/306; H04L 12/185; H04L 51/14; H04L 61/157; H04M 1/274533; H04M 2203/6072; G06F 17/243; G06F 17/30575; G06F 15/177; G06F 21/36; H04W 12/06; H04W 12/08
USPC .................. 709/203, 204, 206; 726/6, 7, 29; 455/405, 410
See application file for complete search history.

(56) References Cited

U.S. PATENT DOCUMENTS

| | | | | |
|---|---|---|---|---|
| 2013/0294443 A1* | 11/2013 | Kahn | .................. | H04L 65/1073 370/352 |
| 2014/0208440 A1* | 7/2014 | Kelley | .............. | G06F 17/30424 726/29 |
| 2014/0325628 A1* | 10/2014 | Huang | ................ | H04L 63/0853 726/7 |
| 2014/0372330 A1* | 12/2014 | Shang | .............. | G06F 17/30684 705/319 |
| 2016/0165446 A1* | 6/2016 | Russo | .................. | H04W 12/06 455/411 |
| 2016/0227414 A1* | 8/2016 | Wan | ...................... | H04W 12/08 |
| 2016/0307172 A1* | 10/2016 | He | ......................... | G06Q 30/02 |

\* cited by examiner

METHOD, SYSTEM AND COMPUTER-READABLE STORAGE MEDIUM FOR CROSS-PLATFORM SYNCHRONIZATION OF CONTACTS IN A MULTI-PLATFORM ENVIRONMENT

CROSS REFERENCE TO RELATED APPLICATION

This application is a continuation application of an International Application No. PCT/CN2013/090990, filed on Dec. 31, 2013, entitled "METHOD, DEVICE AND COMPUTER-READABLE STORAGE MEDIUM FOR CROSS-PLATFORM SYNCHRONIZATION OF CONTACTS IN A MULTI-PLATFORM ENVIRONMENT" by Yongxin WANG, Bin L I, Jing H E, Yu CHEN and Junshan WANG, which claims the priority from the Chinese patent application No. CN 201310244821.5, filed on Jun. 19, 2013. The above-referenced applications are hereby incorporated herein in their entireties by reference.

TECHNICAL FIELD

The present disclosure relates to the mobile Internet technology, and more particularly, to a method, device, and computer-readable storage medium for cross-platform synchronization of contacts in a multi-platform environment.

BACKGROUND

With the development of mobile Internet, the smart mobile terminal has become a handy tool for daily communication, and users can make calls or send SMS to contacts in a contact list by mobile terminal. However, for every contact in the contact list, the information of the contact that can be provided to users only includes mobile number, landline number, address, birthday and note information, etc, and such information has to be entered manually by users. Various social information of the contact in the Internet can only be acquired when users log in to multiple social platforms corresponding to the social information. For example, when a contact updates information on his/her microblog, a user shall run a microblog client in a mobile terminal and log in to find the account corresponding to the contact to acquire the updated information in the microblog. In this way, time spent for operation in the mobile terminal by users will increase, and for the mobile terminal with limited energy, battery life will be shortened.

SUMMARY

In view of the above, an object of the present disclosure is to provide a method for cross-platform synchronization of contacts in a multi-platform environment, which can overcome the conventional method's faults such as complex operation.

According to one aspect of the disclosure, a method for cross-platform synchronization of contacts in a multi-platform environment includes the following steps:

acquiring a contact to be associated with an account in a social platform;

acquiring an account of a friend associated with the contact in the social platform, and binding a phone number of the contact with the associated account of the friend in the social platform; and uploading the phone number and the account in the social platform bound together to a server.

It is another object of the present disclosure to provide a device for cross-platform synchronization of contacts in a multi-platform environment.

According to a further aspect of the disclosure, a device for cross-platform synchronization of contacts in a multi-platform environment includes:

a contact acquisition module, configured to acquire a contact to be associated with an account in a social platform;

an association module, configured to acquire an account of a friend associated with the contact in the social platform and bind a phone number of the contact with the associated account of the friend in the social platform; and an uploading module, configured to upload the phone number and the account in the social platform bound together to a server.

It is still a further object of the present disclosure to provide a non-transitory computer-readable storage medium storing processor executable instructions.

According to a further aspect of the disclosure, a non-transitory computer-readable storage medium is used to store processor executable instructions, and the processor executable instructions are used to control a processor to execute the method for cross-platform synchronization of contacts in a multi-platform environment, wherein the method includes the following steps:

acquiring a contact to be associated with an account in a social platform;

acquiring an account of a friend associated with the contact in the social platform, and binding a phone number of the contact with the associated account of the friend in the social platform; and uploading the phone number and the account in the social platform bound together to a server.

The above method and device for cross-platform synchronization of contacts in a multi-platform environment bind a phone number of a contact with an account of a friend associated with the contact in a social platform, and upload the bound phone number of the contact and the bound account in the social platform to a server, so contacts can be synchronized in multiple social platforms, users can view updated social information of a contact in a social platform by his/her phone number, without having to login the social platform every time, and time spent for operation in the mobile terminal can be reduced, so as to increase the battery life of the mobile terminal.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION OF THE EMBODIMENTS

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

Figure 1:
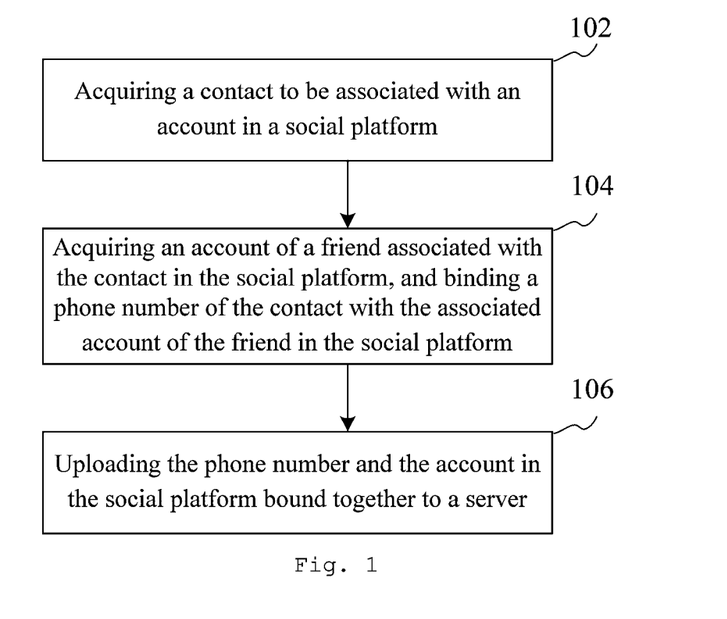
FIG. 1 is a flow diagram illustrating a method for cross-platform synchronization of contacts in a multi-platform environment according to one embodiment of the present disclosure.

In one embodiment of the present disclosure, as shown in FIG. 1, a method for cross-platform synchronization of contacts in a multi-platform environment is provided. The embodiment gives an example to illustrate applying the method to a mobile terminal including a contact list. The mobile terminal is a terminal with mobile communication function, and it can be but is not limited to a smart phone, a tablet computer or a MP3 player. The method includes the following steps:

Step 102, acquiring a contact to be associated with an account in a social platform.

A contact list in a mobile terminal includes one or more contacts, every contact corresponds to one or more phone number, and the user can select one or more contacts to be associated with accounts in a social platform from the contact list.

Step 104, acquiring an account of a friend associated with the contact in the social platform, and binding a phone number of the contact with the associated account of the friend in the social platform.

An account of a friend in a social platform can be but is not limited to an instant messaging number, a microblog account or a registered account in SNS communities of a friend. Optionally, a phone number of a contact can be bound with a plurality of accounts. In the Step 104, the account of a friend associated with the contact in the social platform can be manually input by the user, or selected by the user after contacts in the contact list automatically matching accounts in the social platform.

Step 106, uploading the phone number and the account in the social platform bound together to a server.

After uploading the phone number and the account in the social platform bound together to a server, the phone number and the account bound together are saved in the server, and the binding between the phone number and the account corresponds to an only phone number that uploads the binding. In the embodiment, a contact in a contact list in a mobile terminal can be associated with a contact in a social platform that the contact can be synchronized in multiple social platforms. Because the phone number and the account in the social platform bound together are uploaded to a server, the mobile terminal can acquire the social information of the contact by the phone number of the contact, without having to log in the social platform, and users' operations are simplified, so as to increase the battery life of the mobile terminal.

In one embodiment of the present disclosure, the Step 104 includes the following steps:

acquiring a friend list of the user in the social platform;

acquiring a friend associated with the contact selected from the friend list by the user; and binding a phone number of the contact with the associated account of the friend in the social platform.

In the embodiment, whether the user has logged in the social platform can be detected, and if so, a friend list of the user in the social platform can be acquired directly; otherwise the user may be prompted to log in the social platform, and a friend list of the user in the social platform can be acquired after login. Further, the user can select a friend associated with the contact from the friend list and bind a phone number of the contact with the associated account of the friend in the social platform.

In another embodiment of the present disclosure, the Step 104 includes the following steps:

acquiring a friend list of the user in the social platform;

matching a friend in the friend list to the contact based on friend information in the friend list to get a list of matching of the contact; and acquiring the matching contact and friend selected by the user, and binding a phone number of the contact selected by the user with a account of the matching friend in the social platform.

The friend information can include nickname, name, gender, contact information, etc. In the embodiment, if a mobile number in the friend information of a friend is the same as that of a contact, the friend will be associated with the contact. In the embodiment, a contact can be matched with a friend in a friend list automatically based on friend information after the friend list in the social platform is acquired, and the user can select the matching contact and friend from the friend list and bind a phone number of the selected contact with a account of the matching friend in the social platform.

Figure 2:
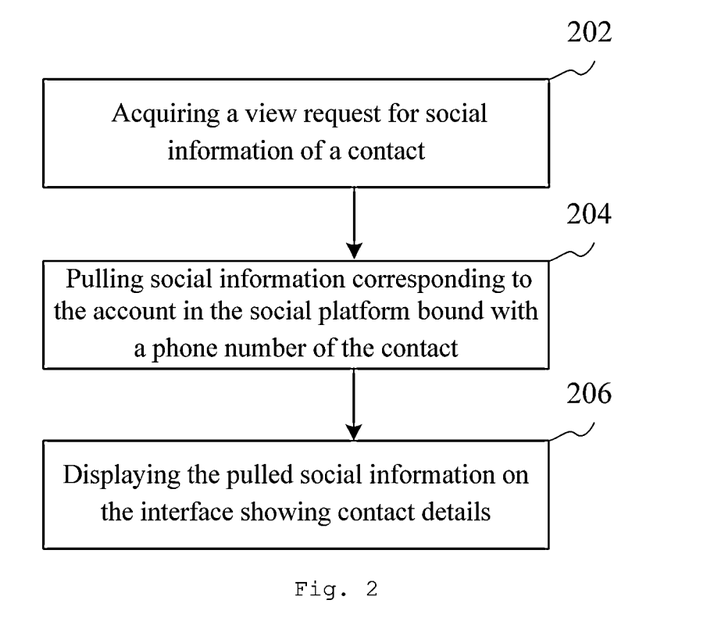
FIG. 2 is a flow diagram illustrating a step of viewing social information of a contact according to one embodiment of the present disclosure.

In one embodiment of the present disclosure, as shown in FIG. 2, based on the embodiment shown in FIG. 1, the method also can view social information of a contact, specifically including the following steps:

Step 202, acquiring a view request for social information of a contact.

Click a contact in a contact list, access to an interface showing contact details and view updated social information;

Step 204, pulling social information corresponding to the account in the social platform bound with a phone number of the contact.

Because a phone number of a contact and a bound account in a social platform are saved in a server, when a mobile terminal acquires a view request for social information of the contact, it will pull the saved social information corresponding to the contact in the social platform form the server.

Step 206, displaying the pulled social information on the interface showing contact details.

The interface showing contact details is configured to show social information of a contact, including personal information in the social platform corresponding to the account such as headshot, nickname, address, etc, and published social content such as microblog content, signature in instant messaging, published log and comment in SNS communities. An interface showing contact details is shown as FIG. 3, where the interface is displayed in the form of cards. Click "Recent" in the interface showing contact details, and access to a page of social information, where the updated social information corresponding to the contact is shown in the form of cards 302, and a piece of social information corresponds to a card 302. Every piece of social information is displayed with the time and source of the piece of social information.

Figure 3:
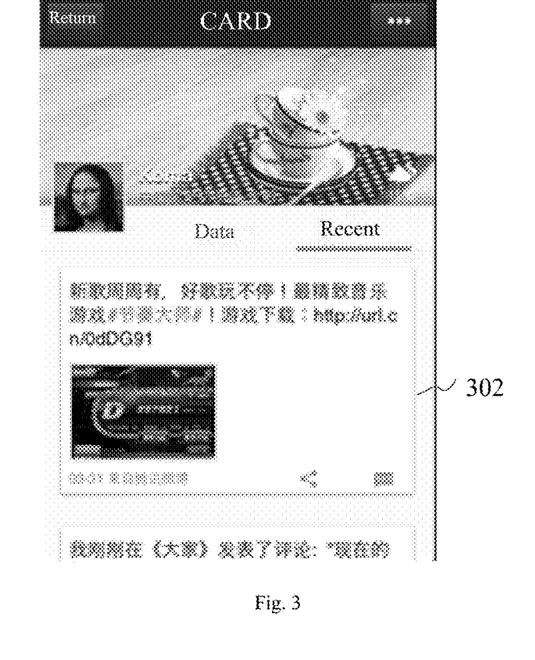
FIG. 3 is a view illustrating an interface showing contact details provided from the step of FIG. 2.

In the embodiment, social information of a contact can be viewed by an interface showing contact details, which is published in different social platforms by the contact, without having to log in various social platforms, so as to increase the battery life of the mobile terminal.

In one embodiment of the present disclosure, a request for setting a contact as a person to be followed also can be acquired, and the contact requested to be set can be marked as a person to be followed. The person to be followed can be a more important contact in the contact list that can be marked in the contact list and listed at the head of the contact list.

Figure 4:
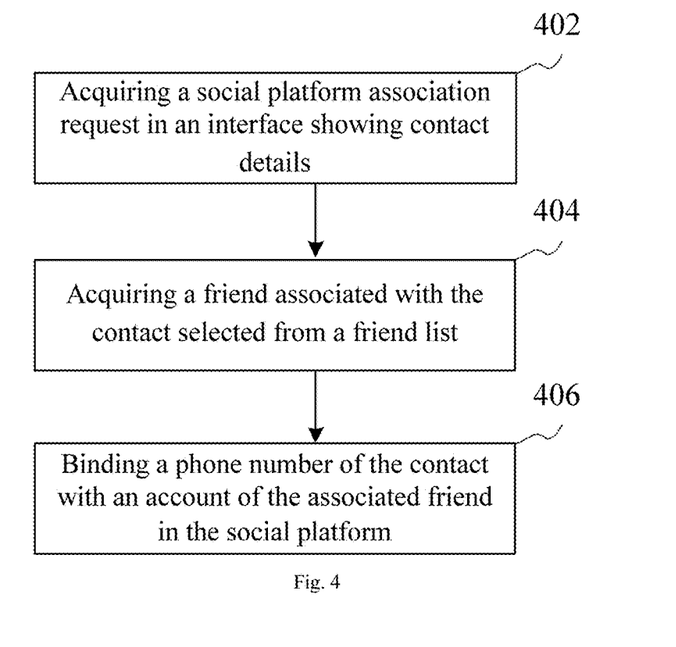
FIG. 4 is a flow diagram illustrating a step of associating a contact with a friend in a social platform according to one embodiment of the present disclosure.

In one embodiment of the present disclosure, as shown in FIG. 4, Step 104 specifically includes the following steps:

Step 402, acquiring a social platform association request in an interface showing contact details.

Figure 5A:
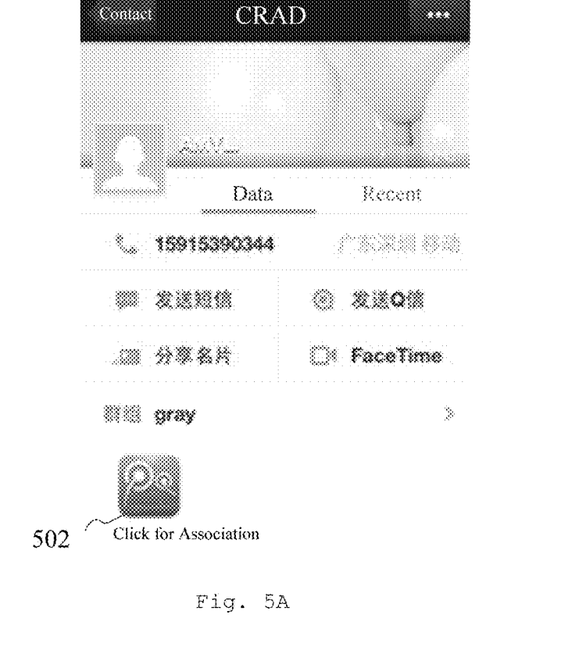
FIGS. 5A-5C are views illustrating how to associate a contact with a friend in a social platform according to the step of FIG. 4.

In the embodiment, click a contact in a contact list of a mobile terminal, access to an interface showing contact details and acquire a social platform association request in the interface showing contact details. As shown in FIG. 5A, an interface showing contact details shows personal information of the contact, including the contact's name, phone number, address, group, etc. Further, the interface showing contact details can be provided with an association button 502 which can be clicked to trigger a social platform association request. It can be appreciated that the embodiment is not limited to only association with one social platform and the interface showing contact details can be provided with a plurality of association buttons 502 corresponding to social platforms, so one contact can be associated with a plurality of social platforms, such social platforms include but are no limited to SNS communities, microblog platform, instant messaging platform, etc.

Step 404, acquiring a friend associated with the contact selected from a friend list.

Figure 5B:
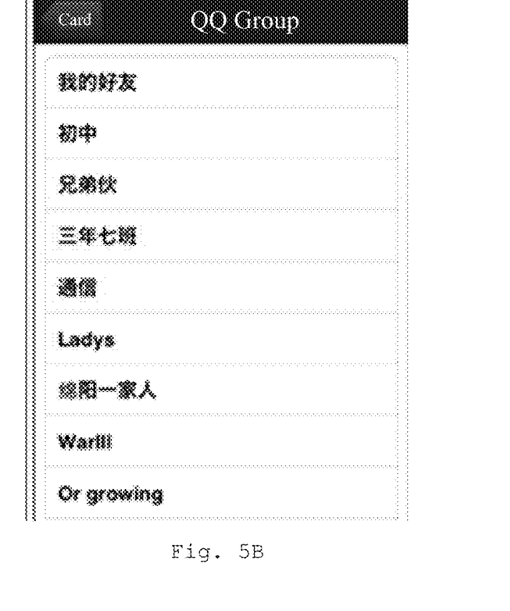
Figure 5C:
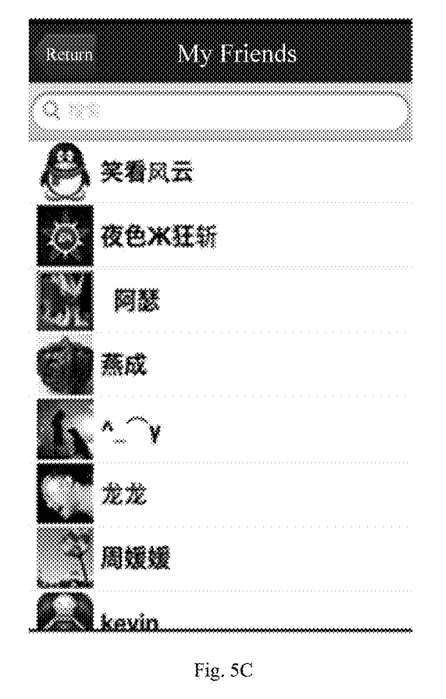

As shown in FIGS. 5B and 5C, a friend list in asocial platform can be displayed in a mobile terminal after the user logging in the social platform, and a friend associated with the contact can be selected by the user from the friend list. It is to be noted the friend in the embodiments of the present disclosure includes but is not limited to friend in a communication platform, friend in SNS communities, follower in a microblog, etc.

Step 406, binding a phone number of the contact with an account of the associated friend in the social platform.

An account of a friend in the friend list selected by the user to be associated with the contact can be acquired, a phone number of the contact is stored in the mobile terminal, and the phone number of the contact can be bound with the account selected to be associated in the social platform. One phone number of the contact can be bound to a plurality of accounts in social platforms. In the embodiment, every contact in the contact list of the mobile terminal can be associated with a friend in a social platform that contacts can be synchronized in multiple social platforms.

Figure 6:
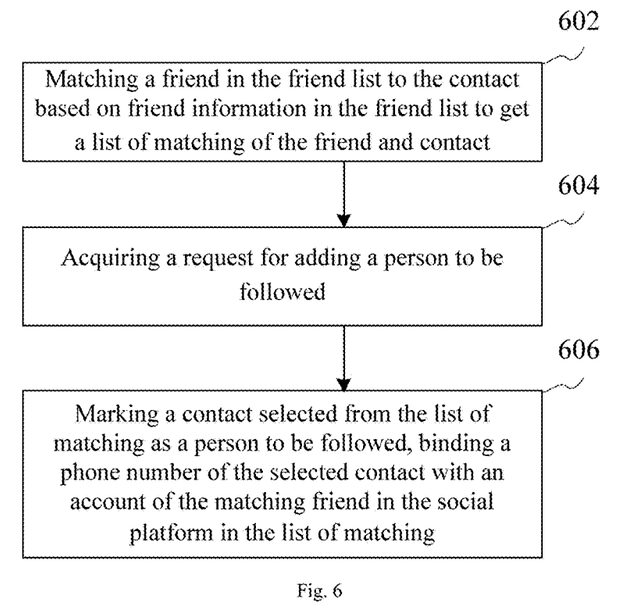
FIG. 6 is a flow diagram illustrating a step of associating a contact with a friend in a social platform according to another embodiment of the present disclosure.

In another embodiment of the present disclosure, as shown in FIG. 6, after acquiring a friend list of the user in the social platform, Step 104 specifically further including the following steps:

Step 602, matching a friend in the friend list to the contact based on friend information in the friend list to get a list of matching of the friend and contact.

The friend information can include nickname, name, gender, contact information, etc. Preferably, the matching can be based on a phone number in friend information that if a friend and a contact have a same phone number, they will be matched, to get a list of matching of the friend and contact.

In one embodiment of the present disclosure, the contact and friend to be associated can be selected from the list of matching, so as to bind a phone number of the selected contact with an account of the matching friend in the social platform and upload to a server. A list of matching of friends and contacts is shown as FIG. 7A, where the list of matching is composed of a plurality of matches 702, every match 702 includes a contact and a friend matching the contact in a social platform, and the match 702 can display which social platform the friend comes from.

Step 604, acquiring a request for adding a person to be followed.

The request for adding a person to be followed can be triggered in an interface showing details of the person to be followed. When a request for adding a person to be followed is acquired, and a list of matching can be accessed for selecting the contact and friend to be associated.

Step 606, marking a contact selected from the list of matching as a person to be followed, binding a phone number of the selected contact with an account of the matching friend in the social platform in the list of matching.

Figure 7A:
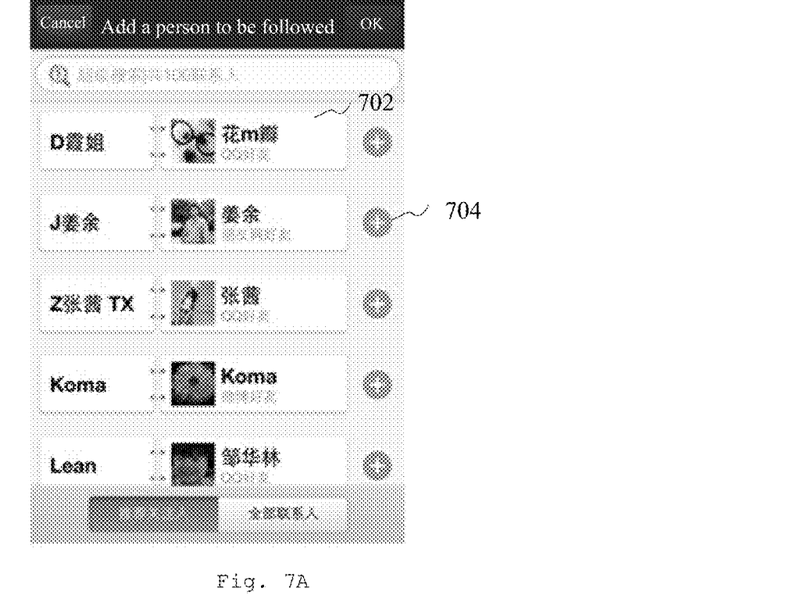
FIG. 7A is a view illustrating a list of matching provided from the step of FIG. 6.

A contact set as a person to be followed in the list of matching can be selected and associated with the matching friend. As shown in FIG. 7A, when the list of matching is accessed, a match 702 can be selected by clicking a button 704, the contact in the selected match 702 can be marked as a person to be followed, and a phone number of the contact can be bound with an account of the friend in the match 702 in the social platform.

In the embodiment, a contact in a contact list can be matched with a friend of the user in social platform automatically, without having to associate a contact with an account in a social platform by accessing an interface showing contact details for every contact, and contacts can be quickly associated with friends in social in bulk by a list of matching, to save the time of operation and further increase the battery life of the mobile terminal. In addition, a more important contact in a contact list can be quickly positioned by marking the contact bound to an account in a social platform as a person to be followed, and social information of the person to be followed can be acquired directly by uploading the phone number of the contact and the bound account in the platform to a server, which can reduce the data of the server and improve the speed of the data transmission compared with acquiring social information of all contacts.

Figure 7B:
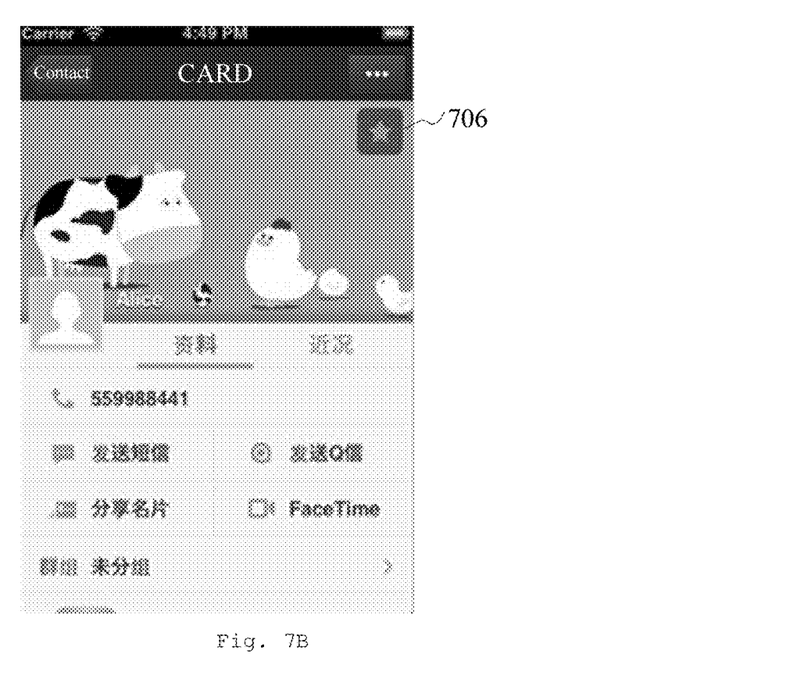
FIG. 7B is a view illustrating how to add a people to be followed to an interface showing contact details according to one embodiment of the present disclosure.

In one embodiment of the present disclosure, a person to be followed can be set manually, specifically, a request for setting a contact as a person to be followed can be acquired in an interface showing contact details, and the contact requested to be set can be marked as a person to be followed. An interface showing contact details is shown as FIG. 7B, the interface showing contact details is provided with a adding button 706 for adding a person to be followed, if an operation of clicking the adding button 706 is acquired, the contact is marked as a person to be followed. In the interface showing contact details marked as a person to be followed, the adding button 706 can be highlighted to identify that the contact has been set as a person to be followed, while in the interface showing contact details not marked as a person to be followed, the adding button 706 can be shown in dark-colored (as shown in FIG. 7B).

Figure 8:
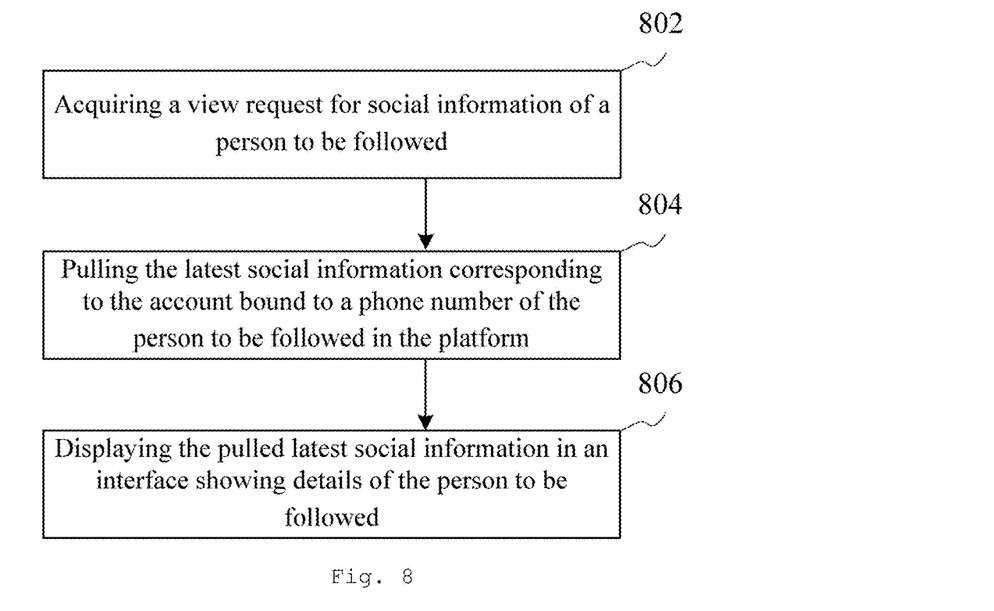
FIG. 8 is a flow diagram illustrating a step of viewing social information of a contact according to one embodiment of the present disclosure.

Based on the above embodiment, the method also can view the lasted social information of the person to be followed, specifically, as shown in FIG. 8, it also includes:

Step 802, acquiring a view request for social information of a person to be followed.

Figure 9A:
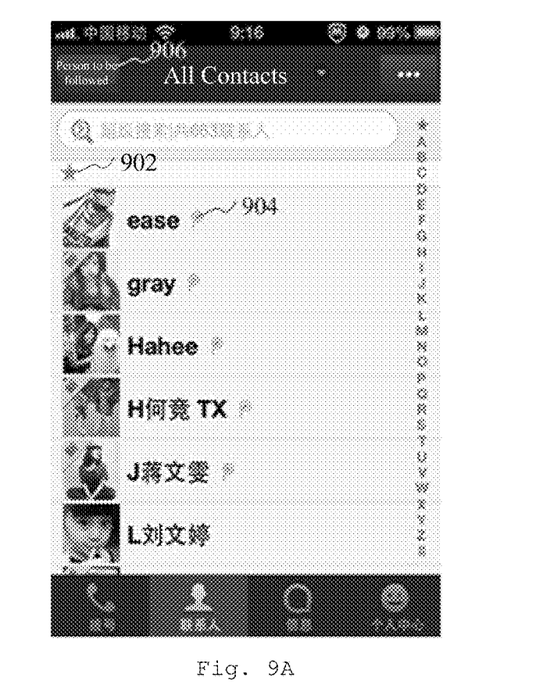
FIGS. 9A-9B are interface diagrams illustrating interfaces showing a contact list and details of a people to be followed.

In the embodiment, after the contact is set as a person to be followed, the information of the contact can be uploaded to a server, including name, address, phone number, etc. Further, the view request for social information of the contact can be triggered by clicking the button of the person to be followed in an interface of contact list. A contact list is shown as FIG. 9A, where a person to be followed is listed at the head of the contact list and marked as an icon 902. For a contact associated with an account in a social platform, he or she is marked with the associated social platform 904 accordingly. The contact list is provided with an entrance 906 to view the person to be followed.

Step 804, pulling the latest social information corresponding to the account bound to a phone number of the person to be followed in the platform.

The phone number of the person to be followed is stored in the mobile terminal, the account bound to the phone number of the person to be followed in the social platform can be acquired, and the corresponding latest social information can be pulled based on the acquired account in the platform.

Step 806, displaying the pulled latest social information in an interface showing details of the person to be followed.

Figure 9B:
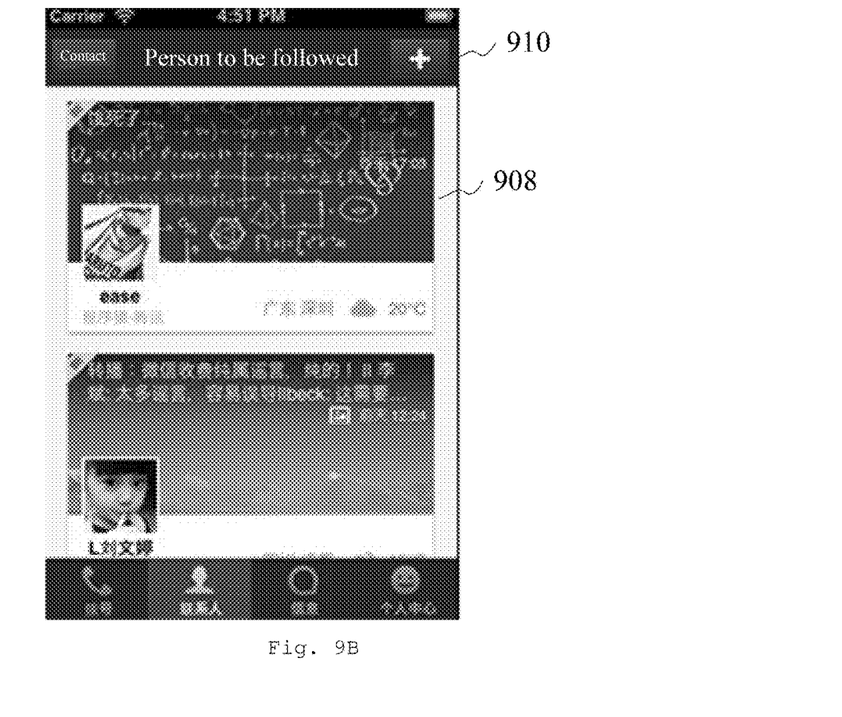

In the embodiment, the server stores social information of the person to be followed pulled from various social servers, and the mobile terminal can pull the latest piece of social information of the person to be followed from the server to display. An interface showing details of the person to be followed is shown as FIG. 9B, where the latest piece of social information of every person to be followed is displayed in the form of cards 908, the interface showing details of the person to be followed is provided with an entrance 910 to add a person to be followed, and the list of matching can be accessed by the entrance 910, as shown in FIG. 7A, so as to add a new person to be followed. Because the server also store information of the person to be followed, the mobile terminal also can pull personal information of the person to be followed, such as nickname, headshot, background image, address, weather and so on, to display.

In the embodiment, the updated social information of all persons to be followed can be quickly viewed by the user by the latest piece of social information of every person to be followed displaying in the interface showing details of the person to be followed, without having to click to enter the interface showing contact details of every person to be followed, so as to improve the speed of view, further simplify the operation, and increase the battery life of the mobile terminal. In one embodiment of the present disclosure, the person to be followed can be managed, including adding a new person to be followed, deleting an existing person to be followed, modifying a remark of a person to be followed, etc. Specifically, access an interface showing contact details, and click the corresponding button to add or cancel a person to be followed. For example, as shown in FIG. 7B, if click the adding button 706, the contact will be set as a person to be followed, and if click the adding button 706 again, the contact set as a person to be followed will be canceled. For another example, the contact set as a person to be followed also can be canceled by accessing the interface showing details of the person to be followed.

Figure 10:
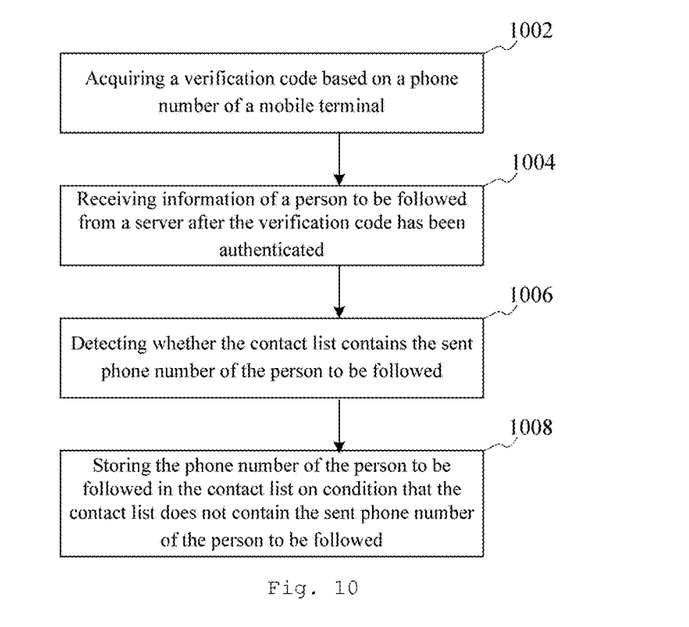
FIG. 10 is a flow diagram illustrating a step of synchronizing a people to be followed in different mobile terminals according to one embodiment of the present disclosure.

In one embodiment of the present disclosure, the method can further synchronize a contact between different mobile terminals, as shown in FIG. 10. The method may specifically include the following steps.

Step 1002, acquiring a verification code based on a phone number of a mobile terminal.

When a user changes a mobile terminal, the user can be prompted for message verification. The phone number input by the user can be received to generate a verification code which will be sent to a mobile terminal corresponding to the phone number in the form of message.

Step 1004, receiving information of a person to be followed from a server after the verification code has been authenticated.

Receive the verification code input by the user, and determine whether the received verification code is the same as the generated verification code, if so, it indicates the mobile terminal is used by the user; if not, the verification fails. In this way, the security of synchronization of contacts can be improved. Because information of the person to be followed has been uploaded to a server in advance and the information corresponds to an only phone number, the corresponding information of the person to be followed can be sent to the mobile phone with the corresponding phone number by the server once the verification is successful.

Step 1006, detecting whether the contact list contains the sent phone number of the person to be followed.

Step 1008, storing the phone number of the person to be followed in the contact list on condition that the contact list does not contain the sent phone number of the person to be followed.

If the contact list does not contain the sent phone number of the person to be followed, the user can be prompted to confirm whether to store the phone number of the person to be followed in the contact list, and the phone number of the person to be followed can be stored in the contact list after receiving confirm operation form the user.

In the embodiment, when a user changes a mobile terminal, a phone number of a person to be followed can be synchronously updated, and the user does not need to enter the individual phone number to the mobile terminal manually compared with traditional techniques, so a contact can be synchronously updated cross terminals, time spent for operation in the mobile terminal can be reduced, and further increase the battery life of the mobile terminal.

Figure 11:
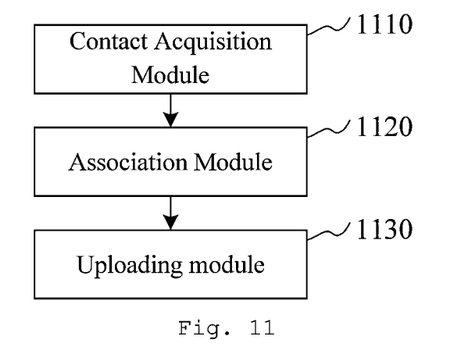
FIG. 11 is a structure diagram illustrating a device for cross-platform synchronization of contacts in a multi-platform environment according to one embodiment of the present disclosure.

In one embodiment of the present disclosure, as shown in FIG. 11, a device for cross-platform synchronization of contacts in a multi-platform environment includes:

a contact acquisition module 1110, configured to acquire a contact to be associated with an account in a social platform;

an association module 1120, configured to acquire an account of a friend associated with the contact in the social platform and bind a phone number of the contact with the associated account of the friend in the social platform; and an uploading module 1130, configured to upload the phone number and the account in the social platform bound together to a server.

Figure 12:
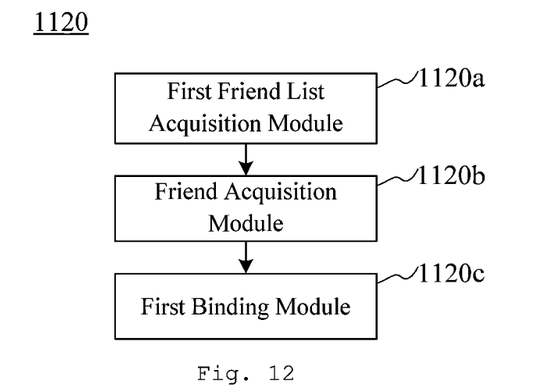
FIG. 12 is a structure diagram illustrating an association module of the device according to one embodiment of the present disclosure.

In one embodiment of the present disclosure, as shown in FIG. 12, the association module 1120 includes:

a first friend list acquisition module 1120a, configured to acquire a friend list of the user in the social platform;

a friend acquisition module 1120b, configured to acquire a friend associated with the contact selected from the friend list by the user; and a first binding module 1120c, configured to bind a phone number of the contact with the associated account of the friend in the social platform.

Figure 13:
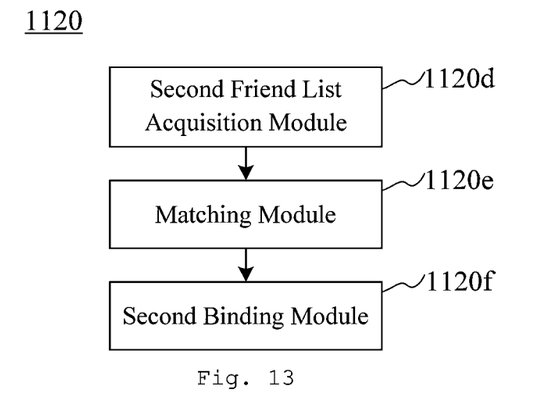
FIG. 13 is a structure diagram illustrating an association module of the device according to another embodiment of the present disclosure.

In another embodiment of the present disclosure, as shown in FIG. 13, the association module 1120 includes:

a second friend list acquisition module 1120d, configured to acquire a friend list of the user in the social platform;

a matching module 1120e, configured to match a friend in the friend list to the contact based on friend information in the friend list to get a list of matching of the contact; and a second binding module 1120f, configured to acquire the matching contact and friend selected by the user, and bind a phone number of the contact selected by the user with a account of the matching friend in the social platform.

Figure 14:
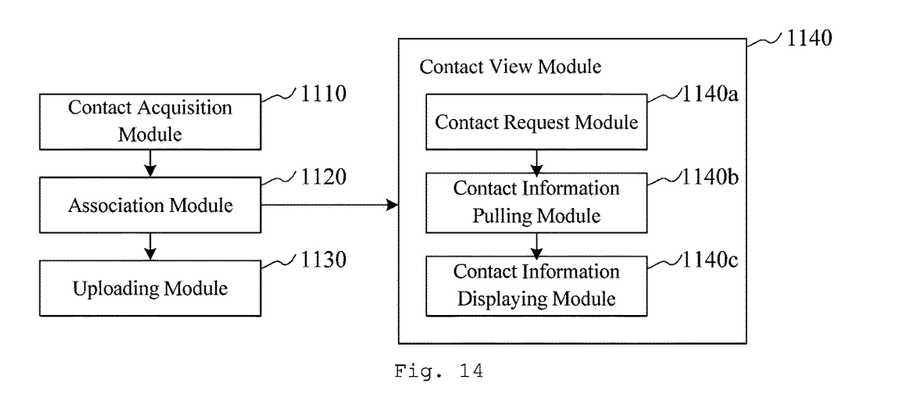
FIG. 14 is a structure diagram illustrating a device for cross-platform synchronization of contacts in a multi-platform environment according to an additional embodiment of the present disclosure.

In one embodiment of the present disclosure, as shown in FIG. 14, based on the embodiment as shown in FIG. 11, the device also includes a contact view module 1140, and the contact view module 1140 includes:

a contact request module 1140a, configured to acquire a view request for social information of a contact;

a contact information pulling module 1140b, configured to pull social information corresponding to the account bound to a phone number of the contact in the platform; and a contact information displaying module 1140c, configured to display the pulled social information in an interface showing contact details.

Figure 15:
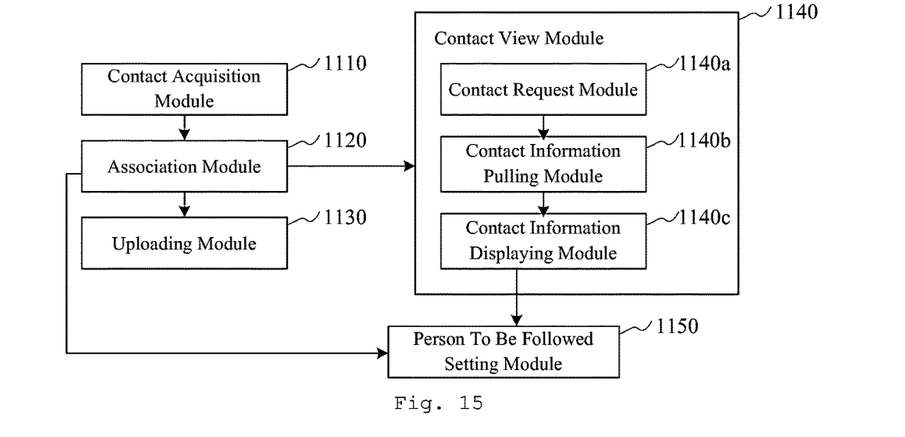
FIG. 15 is a structure diagram illustrating a device for cross-platform synchronization of contacts in a multi-platform environment according to a further embodiment of the present disclosure.

In one embodiment of the present disclosure, as shown in FIG. 15, based on the above embodiment, the device also includes a person to be followed setting module 1150, configured to acquire a request for setting a contact as a person to be followed and mark the contact requested to be set as a person to be followed.

Figure 16:
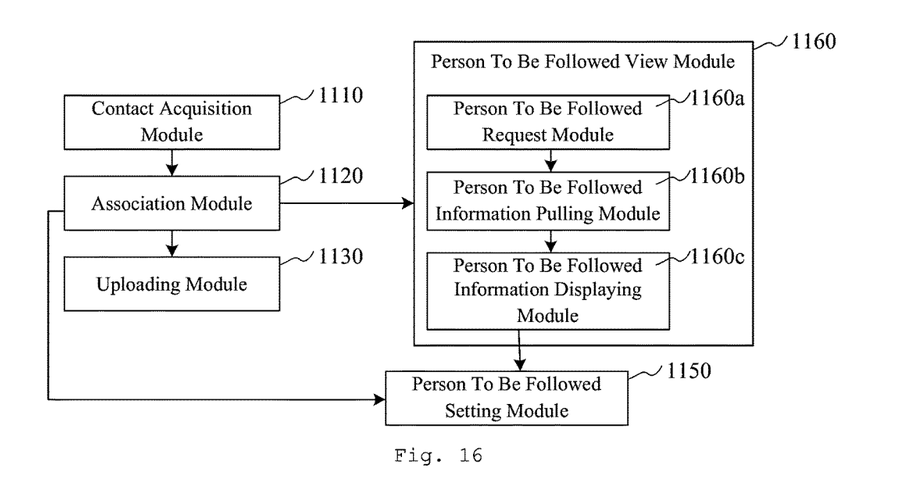
FIG. 16 is a structure diagram illustrating a device for cross-platform synchronization of contacts in a multi-platform environment according to yet a further embodiment of the present disclosure.

In one embodiment of the present disclosure, as shown in FIG. 16, based on the embodiment as shown in FIG. 15, the device also includes a person to be followed view module 1160, and the person to be followed view module 1160 includes:

a person to be followed request module 1160a, configured to acquire a view request for information of a person to be followed;

a person to be followed information pulling module 1160b, configured to pull the latest social information corresponding to the account bound to a phone number of the person to be followed in the platform; and a person to be followed information displaying module 1160c, configured to display the pulled latest social information in an interface showing details of the person to be followed.

It should be noted that the person to be followed view module 1160 also can be added to the embodiment as shown in FIG. 15 in other embodiments.

Figure 17:
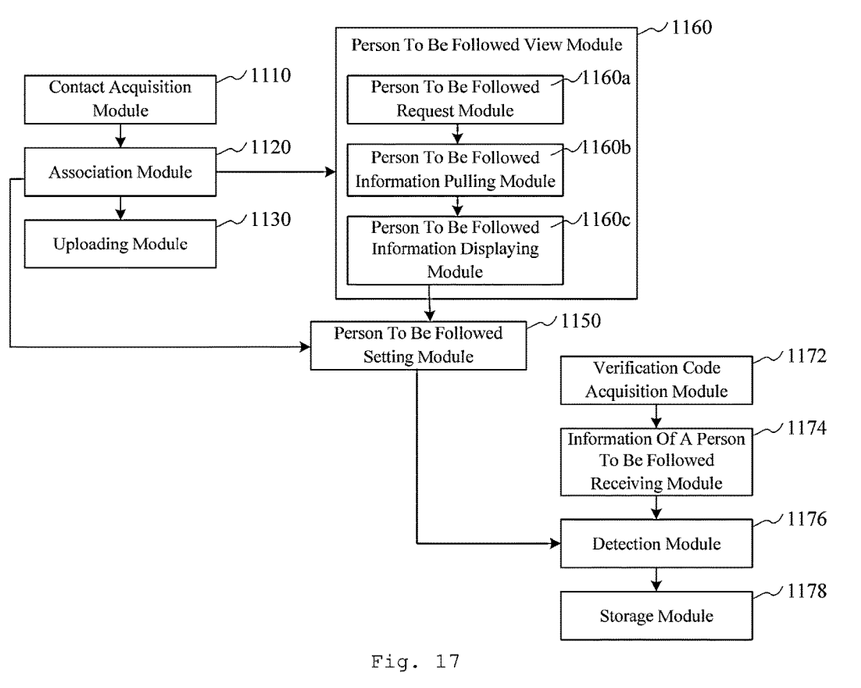
FIG. 17 is a structure diagram illustrating a device for cross-platform synchronization of contacts in a multi-platform environment according to still a further embodiment of the present disclosure.

In one embodiment of the present disclosure, as shown in FIG. 17, based on the embodiment as shown in FIG. 16, the device also includes:

a verification code acquisition module 1172, configured to acquire a verification code based on a phone number of a mobile terminal;

a information of a person to be followed receiving module 1174, configured to receive information of a person to be followed from a server after the verification code has been authenticated;

a detection module 1176, configured to detect whether the contact list contains the sent phone number of the person to be followed; and a storage module 1178, configured to store the phone number of the person to be followed in the contact list on condition that the contact list does not contain the sent phone number of the person to be followed.

It should be understood that the device can also include every module in the above embodiments.

It should be understood for a person skilled in the art that partial or full process to realize the methods in the above embodiments can be accomplished by related hardware instructed by a computer program, the program can be stored in a computer readable storage medium and the program can include the process of the embodiments of the above methods. Wherein, the storage medium can be a disk, a light disk, a Read-Only Memory or a Random Access Memory.

The embodiments are chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

The invention claimed is:

1. A method for cross-platform synchronization of contacts performed by a processor of a mobile terminal controlled by executable instructions in a multi-platform environment, comprising:

acquiring, by the processor, contact information associated with a contact;

acquiring, by the processor, an account of a friend associated with the contact in a social platform, thereby forming an associated account;

binding, by the processor, the contact information of the contact with the associated account of the friend in the social platform, wherein the contact information includes a phone number and thereby forms a bound phone number;

uploading, by the processor, the bound phone number and the associated account of the friend in the social platform on a server;

sending, by the processor, a view request for social information of the contact to the server;

receiving, by the processor, social information corresponding to the account in the social platform bound with the contact information of the contact from the server, based on the view request, without logging in the social platform on the mobile terminal;

displaying, by the processor, the pulled social information on the mobile terminal with a display interface showing a contact list, contact details and social content published in a plurality of social platforms by the contact, wherein the display interface is displayed in a form of cards; is provided a button of adding or canceling a person to be followed from the contact list; and is further provided with a plurality of association buttons corresponding to the plurality of social platforms so the contact can be associated with one or more of the plurality of social platforms, and wherein the view request for the social information of the contact is triggered by clicking the button of the person to be followed in the contact list of the display interface;

setting, by the processor, the contact as the person to be followed, and sending the contact information of the person to be followed to the sever;

acquiring, by the processor, a verification code from the server, based on a phone number for the mobile terminal;

receiving, by the processor, the contact information of the person to be followed, from the server, after the verification code has been authenticated;

detecting, by the processor, whether the phone number included in the contact information of the person to be followed is in the contact list; and storing, by the processor, the phone number included in the contact information of the person to be followed in the contact list on condition that the contact list does not contain the phone number included in the contact information of the person to be followed.

2. The method of claim 1, wherein acquiring, by the processor, an account of a friend associated with the contact in a social platform, thereby forming an associated account comprises:

acquiring, by the processor, a friend list of a user in the social platform; and acquiring, by the processor, a friend associated with the contact selected from the friend list by the user.

3. The method of claim 1, wherein acquiring, by the processor, an account of a friend associated with the contact in a social platform, thereby forming an associated account and binding, by the processor, the contact information of the contact with the associated account of the friend in the social platform, wherein the contact information includes a phone number and thereby forms a bound phone number, comprises:

acquiring, by the processor, a friend list of a user in the social platform;

matching, by the processor, a friend in the friend list to the contact based on friend information in the friend list to get a list of matching of the contact, thereby forming a matching friend;

acquiring, by the processor, the contact and the matching friend selected by the user; and binding, by the processor, the contact information of the contact selected by the user with an account of the matching friend in the social platform, wherein the contact information includes a phone number.

4. The method of claim 1, further comprising:

acquiring a view request for information of the person to be followed;

pulling a latest social information corresponding to the account bound to the contact information of the person to be followed in the platform, wherein the contact information includes a phone number; and displaying the pulled latest social information on an interface showing details of the person to be followed.

5. A system for cross-platform synchronization of contacts in a multi-platform environment, comprising:

a server comprising a social platform, and one or more processors, configured to:

acquire contact information associated with a contact;

acquire an account of a friend associated with the contact in the social platform on the server, thereby forming an associated account;

bind the contact information of the contact with the associated account of the friend in the social platform, wherein the contact information includes a phone number and thereby forms a bound phone number;

upload the bound phone number and the associated account of the friend in the social platform;

send a view request for social information of the contact to the server;

receive social information corresponding to the account in the social platform bound with the contact information of the contact from the server, based on the view request, without logging in the social platform on the device;

display the pulled social information on the device with a display interface showing a contact list, contact details and social content published in a plurality of social platforms by the contact, wherein the display interface is displayed in a form of cards; is provided a button of adding or canceling a person to be followed from the contact list; and is further provided with a plurality of association buttons corresponding to the plurality of social platforms so the contact can be associated with one or more of the plurality of social platforms, and wherein the view request for the social information of the contact is triggered by clicking the button of the person to be followed in the contact list of the display interface;

set, the contact as the person to be followed, and sending the contact information of the person to be followed to the sever;

acquire, a verification code from the server, based on a phone number for the mobile terminal;

receive, the contact information of the person to be followed, from the server, after the verification code has been authenticated;

detect, whether the phone number included in the contact information of the person to be followed is in the contact list; and store, the phone number included in the contact information of the person to be followed in the contact list on condition that the contact list does not contain the phone number included in the contact information of the person to be followed.

6. The system of claim 5, wherein the one or more processors are further configured to:
acquire a friend list of a user in the social platform; and
acquire a friend associated with the contact selected from the friend list by the user.

7. The system of claim 5, wherein the processor is further configured to:
acquire a friend list of a user in the social platform;
match a friend in the friend list to the contact based on friend information in the friend list to get a list of matching of the contact, thereby forming a matching friend;
acquire the contact and the matching friend selected by the user; and
bind the contact information of the contact selected by the user with an account of the matching friend in the social platform, wherein the contact information includes a phone number.

8. The system of claim 5, wherein the one or more processors are further configured to:
acquire a view request for information of the person to be followed;
pull a latest social information corresponding to the account bound the contact information of the person to be followed in the platform, wherein the contact information includes a phone number; and
display the pulled latest social information on an interface showing details of the person to be followed.

9. A non-transitory computer-readable storage medium of a mobile terminal storing an executable program to execute a method for cross-platform synchronization of contacts in a multi-platform environment, the method comprising:
acquiring contact information associated with a contact;
acquiring an account of a friend associated with the contact in a social platform, thereby forming an associated account;
binding the contact information of the contact with the associated account of the friend in the social platform, wherein the contact information includes a phone number and thereby forms a bound phone number;
uploading the bound phone number and the associated account of the friend in the social platform on a server;
sending a view request for social information of the contact to the server;
receiving social information corresponding to the account in the social platform bound with the contact information of the contact from the server, based on the view request, without logging in the social platform on the mobile terminal;
displaying the pulled social information on the mobile terminal with a display interface showing a contact list, contact details and social content published in a plurality of social platforms by the contact,
wherein the display interface is displayed in a form of cards; is provided a button of adding or canceling a person to be followed from the contact list; and is further provided with a plurality of association buttons corresponding to the plurality of social platforms so the contact can be associated with one or more of the plurality of social platforms, and
wherein the view request for the social information of the contact is triggered by clicking the button of the person to be followed in the contact list of the display interface;
setting, the contact as the person to be followed, and sending the contact information of the person to be followed to the sever;
acquiring, a verification code from the server, based on a phone number for the mobile terminal;
receiving, the contact information of the person to be followed, from the server, after the verification code has been authenticated;
detecting, whether the phone number included in the contact information of the person to be followed is in the contact list; and
storing, the phone number included in the contact information of the person to be followed in the contact list on condition that the contact list does not contain the phone number included in the contact information of the person to be followed.

* * * * *